United States Patent [19]

Sudoh et al.

[11] Patent Number: 5,124,986
[45] Date of Patent: Jun. 23, 1992

[54] DATA RECORDING/REPRODUCING APPARATUS

[75] Inventors: Kengo Sudoh; Chitoku Kiyonaga, both of Higashihiroshima, Japan

[73] Assignee: Sharp Kabushiki Kaisha, Osaka, Japan

[21] Appl. No.: 770,790

[22] Filed: Oct. 7, 1991

Related U.S. Application Data

[63] Continuation of Ser. No. 466,645, Jan. 17, 1990, abandoned.

[30] Foreign Application Priority Data

Jan. 19, 1989 [JP] Japan .................................. 1-11021

[51] Int. Cl.⁵ ............................................. G06F 11/00
[52] U.S. Cl. ..................................................... 371/5.1
[58] Field of Search ................. 371/5.1, 10.1, 10.2, 371/21.2, 37.4, 37.7, 40.1, 40.2, 40.3; 360/53, 31, 36.1, 36.2; 369/53, 54

[56] References Cited

U.S. PATENT DOCUMENTS

| | | | |
|---|---|---|---|
| 4,414,665 | 11/1983 | Kimura et al. | 371/21.2 |
| 4,682,332 | 7/1987 | Okamoto et al. | 371/37.4 |
| 4,768,193 | 8/1988 | Takemae | 371/10.3 |
| 4,799,221 | 1/1989 | Fukami et al. | 371/40.2 |
| 4,800,563 | 1/1989 | Itagaki et al. | 371/10.2 |
| 4,809,276 | 2/1989 | Lemay et al. | 371/5.1 |
| 4,852,102 | 7/1989 | Yamaguchi | 371/37.4 |
| 4,866,712 | 9/1989 | Chao | 371/5.1 |
| 4,872,171 | 10/1989 | Wakumura et al. | 371/5.4 |
| 4,908,811 | 3/1990 | Yokogawa et al. | 360/53 |

FOREIGN PATENT DOCUMENTS

| | | |
|---|---|---|
| 0272130 | 6/1988 | European Pat. Off. |
| 0278702 | 8/1988 | European Pat. Off. |
| 3612815 | 4/1986 | Fed. Rep. of Germany |
| 60-254463 | 12/1985 | Japan |
| 2175123 | 11/1986 | United Kingdom |

*Primary Examiner*—Jerry Smith
*Assistant Examiner*—Phung My Chung

[57] ABSTRACT

A data recording/reproducing apparatus can record-/reproduce digital data because a parity check code is added to the data at the time of recording. The original data can be reproduced through error correction even though part of the data is lost at the time of reproducing. In the present recording and reproducing apparatus, data immediately after being recorded is read and the number of errors is detected by a parity check code. When the number of errors in the data is equal to or greater than a predetermined reference value, the data is re-recorded in another unit recording area. By setting the reference value at a value less than the maximum number of errors which can be corrected by parity check codes, data can be re-recorded without apprehension that the errors cannot be corrected because the increased number of errors has been caused by deterioration of the recording state of the unit recording area due to repetition of reproducing operations.

3 Claims, 4 Drawing Sheets

DATA RECORDING/REPRODUCING APPARATUS

This application is a continuation of application Ser. No. 07/466,645 filed on Jan. 17, 1990, now abandoned.

BACKGROUND OF THE PRESENT INVENTION

1. Field of the Present Invention

The present invention relates to a data recording/reproducing apparatus such as a rotary head type digital audio tape recorder (hereinafter referred to as R-DAT) and the like which can perform recording/reproducing of digital data.

2. Description of the Prior Art

Up to now, there has been a magnetic recording/reproducing apparatus such as an R-DAT and the like which can reproduce data which has lost part of its original data through error correction in reproduction, by adding some error correction information (such as a parity check code) to the original data when recording digital data on a magnetic tape. Although such an apparatus can correct completely data which very little is lost, it cannot reproduce the original data when a large part of the data has been lost. When using such a magnetic recording/reproducing apparatus as an auxiliary storage of a computer or the like, it is necessary to check a recording state of data after being recorded in order to detect such a situation as this.

For example, therefore, writing heads and reading heads are separately provided and inspection of recorded data is performed by a method called "read after write", namely, a method of reproducing, with a reading head, data written on a magnetic tape by a writing head immediately after writing the data to compare it with the original data. Reliability of data is improved by writing data again when any write error has been detected in the data through inspection of the recorded data by the above-mentioned comparison method and the like.

Generally, an R-DAT performs an azimuth recording by means of two magnetic heads which have their azimuth angles different from each other. It can, therefore, record data in high density by overlapping contiguous tracks on each other. For this reason, a reading head is positioned so that it can reproduced data from the narrow tracks. When tracing a track immediately after recording data on it by means of such a reading head as this, and since a track for data to be next recorded on it has not been formed yet, the reading head reproduces data from a wide track. Since the level of reproducing signal is too high at this time, tracing position of the reading head needs to be shifted slightly.

Since inspection of recorded data in such an R-DAT as mentioned above is performed by a method of comparing data corrected through error correction information with its original data, it has been impossible to detect quantitatively the recording state of the predetermined unit recording area. When repeating a reproducing operation of a magnetic tape a multiple of times, the recording state of the predetermined unit recording area becomes deteriorated due to rubbing between the magnetic tape and the reading head, and the like. There is a case, therefore, that error correction becomes impossible due to the increase in errors after a plurality of reproducing operations even though error correction immediately after recording can correct every error if the data is written in another unit recording area.

SUMMARY OF THE INVENTION

An object of the present invention is to provide a data recording/reproducing apparatus which can solve the above-mentioned problem and record and/or reproduce data with high reliability.

The present invention provides a data recording/reproducing apparatus which adds error correction data for correcting errors in main data to the main data to be recorded, records such data in a predetermined unit recording area on a recording medium by means of a recording means, and comprises;

a reading device which is disposed in close vicinity of a recording device and reads data immediately after it is recorded, an error detecting device for detecting errors in main data on the basis of its error correction data, and a counting device for counting the number of errors based on output from the error detecting device. The error detecting device detects the errors in the main data read by the reading device immediately after recording, and the number of errors in the main data in each unit recording area is counted by the counting device. The original data which was recorded in a first unit recording area having a number of errors equal to or greater than a predetermined reference valve, is recorded, in another unit recording area.

According to the present invention, in a data recording/reproducing apparatus which adds error correction data for detecting errors in main data to the main data to be recorded and records such data in each predetermined unit recording area on a recording medium by a recording device, data immediately after being recorded is reproduced by a reading device during the recording process and the detection of errors in the main data based on the error correction data is performed by an error detecting device. The number of errors in the main data is counted for each unit recording area by a counting device, and the original of data in which the number of errors is equal to or greater than a predetermined reference value is recorded in another unit recording area.

In this way it is possible to detect quantitatively a recording state of an individual unit recording area, and inspection of the recording state can be easily performed. Data in a unit recording area in which the number of errors is equal to or greater than the above-mentioned reference value, namely, data in a unit recording area in which a recording state is bad, is re-recorded. Additionally, by setting the reference value at a value less than the maximum number of errors which can be corrected by error correction data, the data can be re-recorded with no apprehension that it cannot be corrected because the increased number of errors has been caused by deterioration of the recording state owing to repetition of a reproducing operation and the like. Re-recording in another unit area allows every error to be corrected immediately after recording.

According to the present invention as mentioned above, quantitative detection of a recording state of an individual unit area can be performed and inspection of the recording state can be easily performed. Data in a unit recording area in which the number of errors is equal to or greater than the above-mentioned reference value, namely, data in a unit recording area in which a recording state is bad, is re-recorded.

Additionally, by setting the reference value at a value less than the maximum number of errors which can be corrected through error correction data, the data can be re-recorded without apprehension that it cannot be corrected because the increased number of errors in the data has been caused by deterioration of the recording state owing to repetition of reproducing operations and the like. In this way, reliability of a data recording/reproducing apparatus can be remarkably improved.

BRIEF DESCRIPTION OF THE DRAWINGS

These objects, the other objects, features, and merits of the present invention will be clarified more expressly by the following detailed descriptions and drawings.

DETAILED DESCRIPTION OF THE PREFERRED EMBODIMENT

Figure 1:
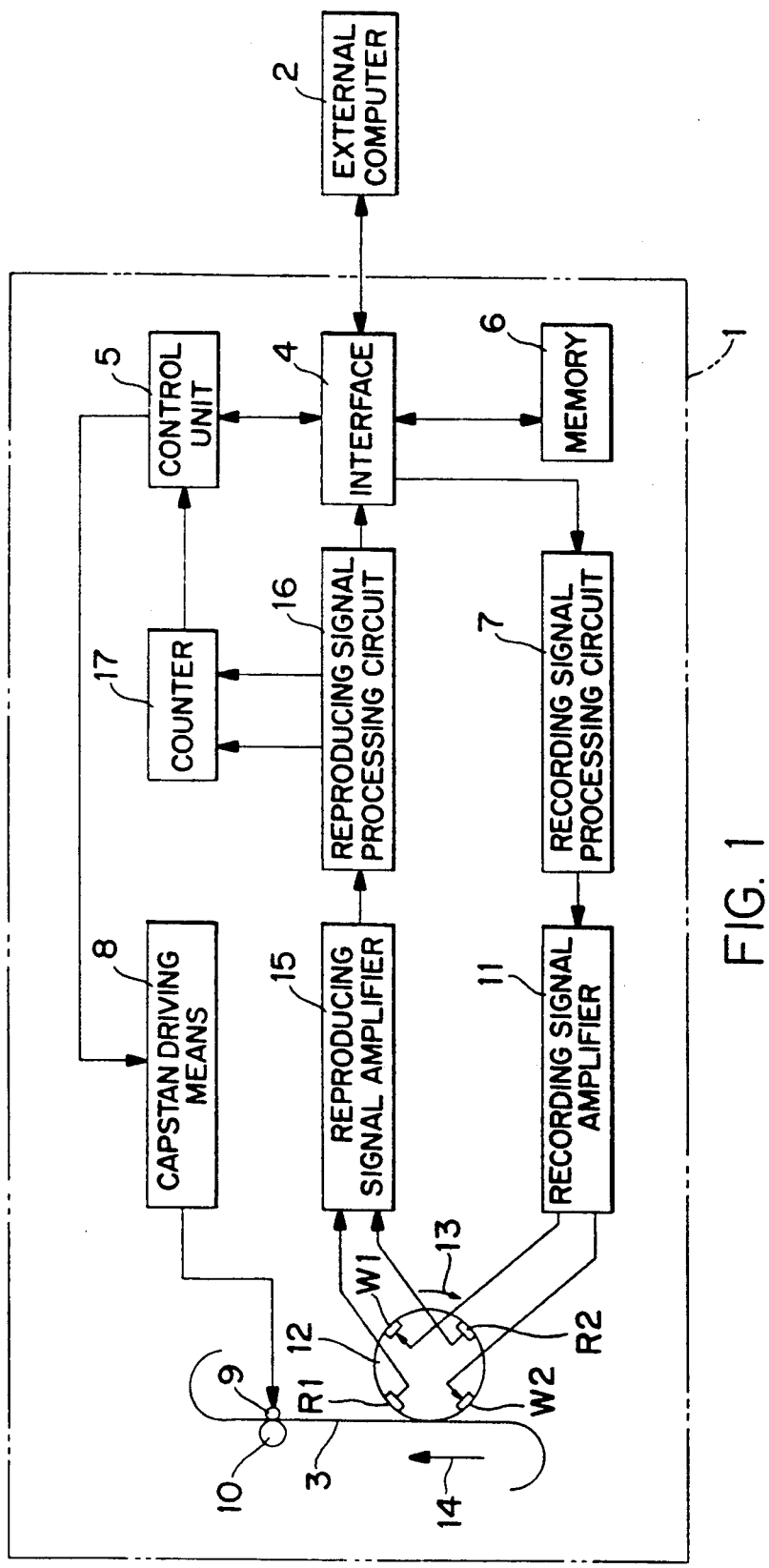
FIG. 1 is a block diagram showing basic configuration of an R-DAT1 of an embodiment of the present invention.

Referring to the drawings, a preferred embodiment of the present invention is described in details below.

FIG. 1 is a block diagram showing basic configuration of an R-DAT1 of an embodiment of the present invention.

The embodiment uses the R-DAT1 as an auxiliary storage of an external computer 2. In case of recording data from the external computer 2 on a magnetic tape 3, the external computer 2 gives data to an interface 4, as well as, gives a data recording instruction to a control unit 5 through the interface 4.

The data is outputted to a recording signal processing circuit 7 as well as outputted to a memory 6, a random access memory or the like, from the interface 4. Input and output operations or the like in the interface 4 are performed according to control signals from the control unit 5 implemented by a microcomputer or the like.

In the recording signal processing circuit 7, error correction codes and the like are added to each frame of data. The frame is a unit recording area consisting of two tracks formed respectively by recording heads W1 and W2 described later.

Figure 2:
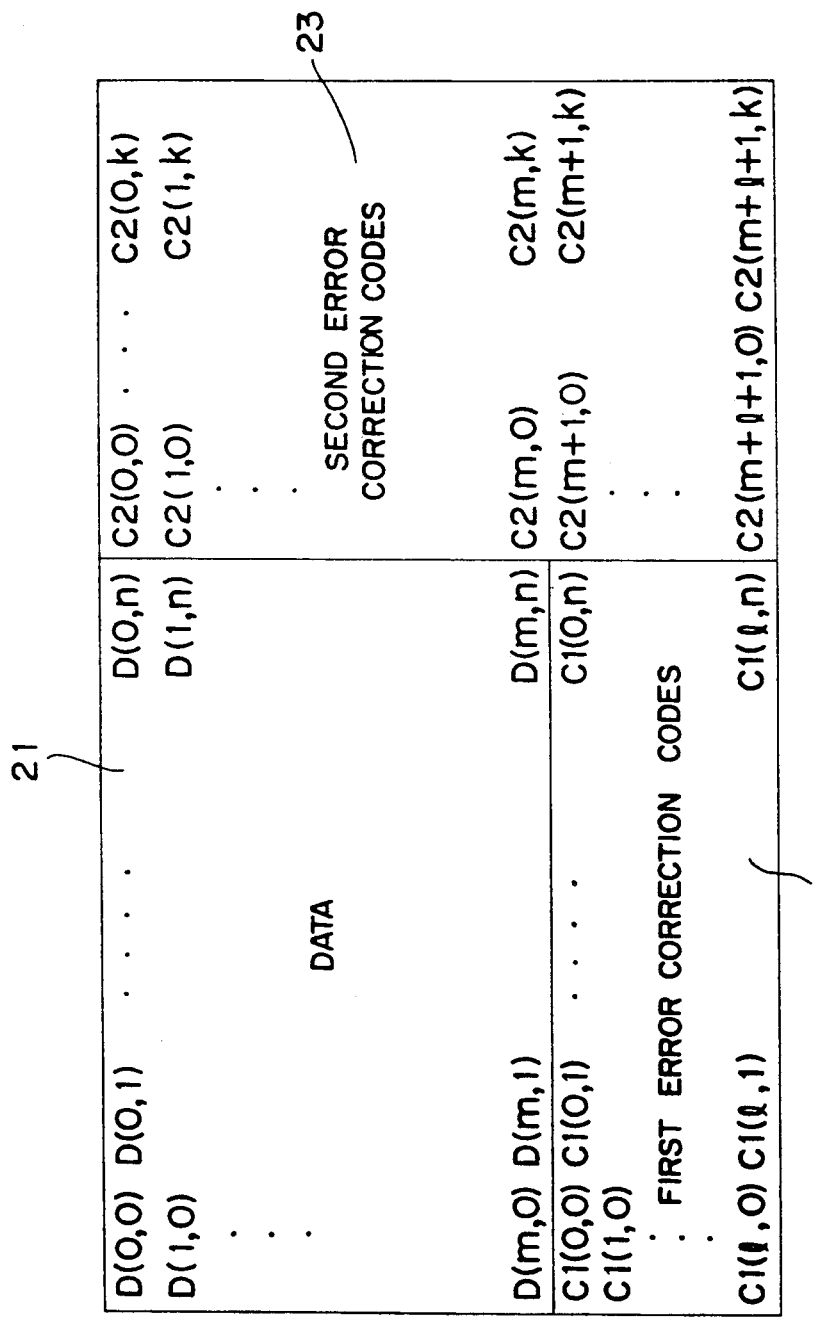
FIG. 2 is a diagram showing configuration of data to be recorded on a magnetic tape 3.

FIG. 2 is a figure showing a configuration of data and the error correction codes to be recorded in one frame. One frame of data consist of data D to be recorded in a recording area 21, first error correction codes C1 which are vertical parity check codes to be recorded in a recording area 22, and second error correction codes C2 which are horizontal parity check codes to be recorded in a recording area 23.

Addition of error correction codes is started with the addition of the first error correction codes C1. The first error correction codes C1 (0, 0) to C1 (1, 0) are added to the data D (0, 0) to D (m, 0), and in the same way the first error correction codes C1 (0, 1) to C1 (1, 1) through the first error correction codes C1 (0, n) to C1 (1, n) are respectively added to the data D (0, 1) to D (m, 1) through the data D (0, n) to D (m, n). In this way the first error correction codes C1 of the n+1 columns have been added to the data.

Next, the second error correction codes C2 are added to the data D and the first error correction codes C1, respectively. The second error correction codes C2 (0, 0) to C2 (0, k) are added to the data D (0, 0) to D (0, n), and in the same way the second error correction codes C2 (1, 0) to C2 (1, k) through the second error correction codes C2 (m, 0) to C2 (m, k) are respectively added to the data D (1, 0) to D (1, n) through the data D (m, 0) to D (m, n).

And the second error correction codes C2 (m+1, 0) to C2 (m+1, k) through the second error correction codes C2 (m+l+1, 0) to C2 (m+l+1, k) are respectively added to the first error correction codes C1 (0, 0) to C1 (0, m) through the first error correction codes C1 (l, 0) to C1 (l, n). In this way the second error correction codes C2 of the m+l+2 rows have been added.

Signals of the data to which the first and second error correction codes C1 and C2 were added in this way are modulated in order to be recorded on the magnetic tape 3 and supplied to a recording signal amplifier 11.

The data signals amplified by the recording signal amplifier 11 are recorded on the magnetic tape 3 by the recording heads W1 and W2 mounted on a rotary drum 12. Such recording heads W1 and W2, and reproducing heads R1 and R2 described later are fixed on the rotary drum 12 of circular cylinder type. The rotary drum 12 is rotated in the direction of an arrow 13 by a motor (not shown in the FIG. 1). The magnetic tape 3 is run in the direction of an arrow 14 by a capstan 9 and a pinch roller 10. At this time a capstan driving means 8 controls the capstan 9 according to a control signal from the control unit 5.

Figure 3:
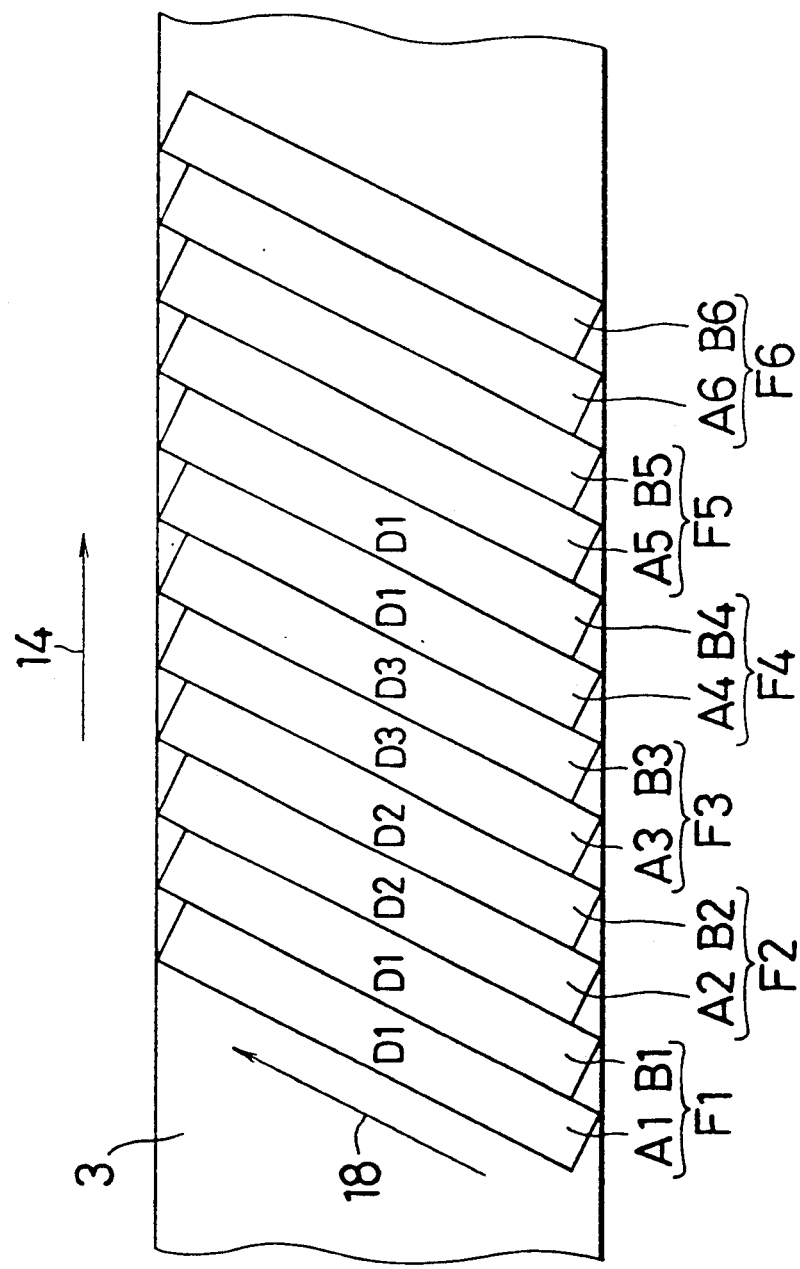
FIG. 3 is a diagram showing a recording pattern of the magnetic tape 3 on which data are recorded.

As shown in FIG. 3, the recording heads W1 and W2 form respectively tracks Ai and Bi (i=1, 2, ...) by tracing in the direction of an arrow 18 on the magnetic tape 3 being run in this way. The track Ai, which is a portion recorded by the recording head W1, is reproduced by the reproducing head R1. The track Bi, which is a portion recorded by the recording head W2, is reproduced by the reproducing head R2. Each data is recorded in a frame Fi consisting of one pair of tracks Ai and Bi.

Data recorded on the magnetic tape 3 are reproduced by the reproducing heads R1 and R2. The reproducing heads R1 and R2 reproduce data respectively from the tracks Ai and Bi formed by the recording heads W1 and W2. Signals from the reproducing heads R1 and R2 are amplified by a reproducing signal amplifier 15 and supplied to a reproducing signal processing circuit 16.

In the reproducing signal processing circuit 16, error correction and the like are performed by means of the first and second error correction codes C1 and C2 added in the recording signal processing circuit 7. By inspection of a recording state immediately after recording during recording process, a quantity called syndrome is calculated, using the second error correction codes C2. That is to say, using the second error correction codes C2 (0, 0) to C2 (0, k) through the second error correction codes C2 (m, 0) to C2 (m, k), syndromes of the data D (0, 0) to D (0, n) through the data D (m, 0) to D (m, n) are calculated, and using the error correction codes C2 (m+1,0) to C2 (m+1,k) through C2 (m+l+1,0) to C2 (m+l+1,k), syndromes of the first error correction codes C1 (0, 0) to C1 (0, n) through the first error correction codes C1 (l, 0) to C1 (l, n) are calculated. Calculation of these syndromes makes it possible to detect the number of errors and location where they occur.

A syndrome is calculated for each data unit of one row. When an error is found in the reproduced data, a pulse signal is supplied to a counter 17 from the reproducing signal processing circuit 16. Each time calculation of syndromes of one frame portion, namely, syndromes of the m+1+2 rows which is performed by means of the second error correction codes C2 is finished, the reproducing signal processing circuit 16 supplies a reset signal to the counter 17. The counter 17 is reset by the reset signal, counts the number of errors for each frame on the basis of the pulse signals, and supplies the count value to the control unit 5. The control unit 5 compares the count value of the counter 17 with a predetermined reference value, and re-records the data when the count value is equal to or greater than the predetermined reference value.

Figure 4:
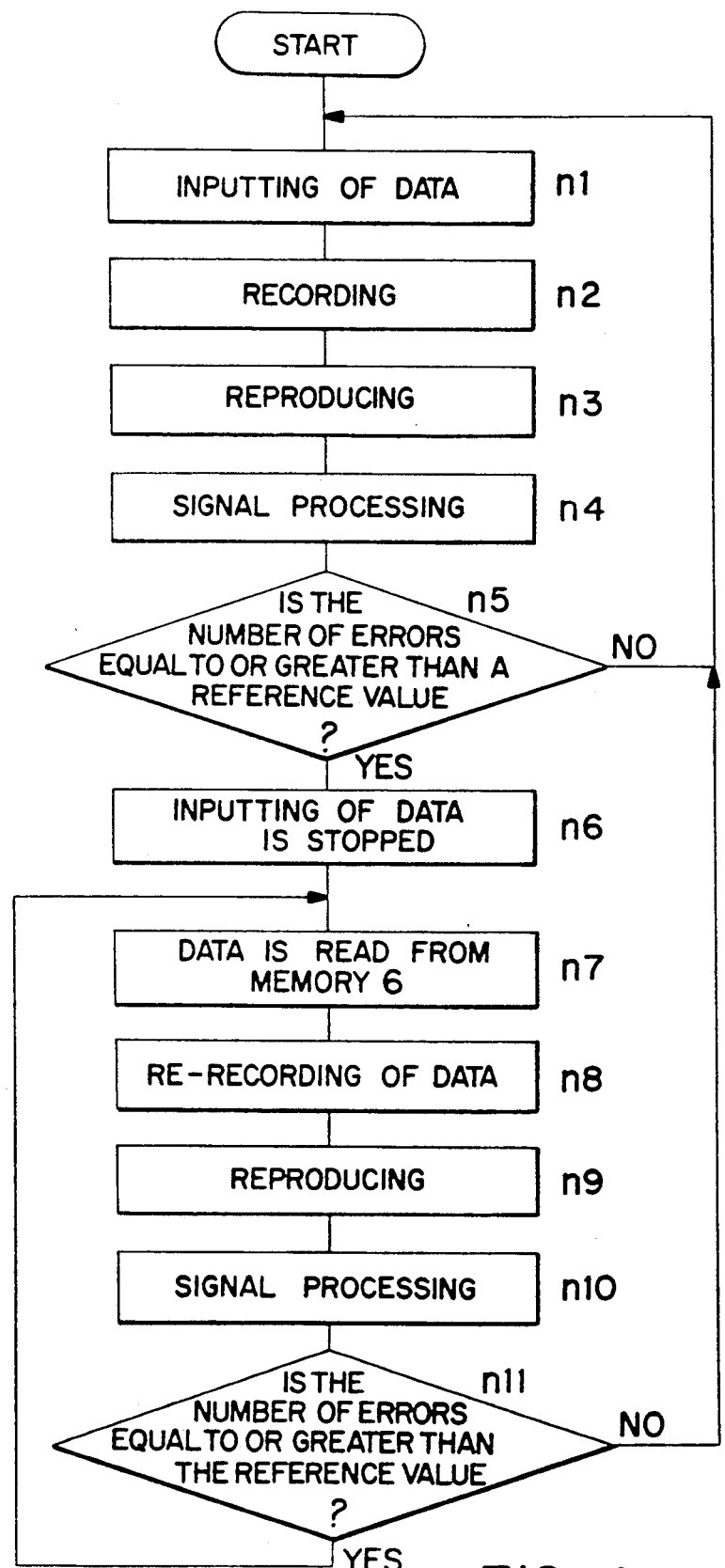
FIG. 4 is a flowchart to explain a recording operation of the R-DAT1.

FIG. 4 is a flowchart to explain a recording operation of the R-DAT1. At step n1, data from the external computer 2 are inputted and at step n2, the data are recorded on the magnetic tape 3. At step n3, the recorded data are reproduced immediately after recording and at step n4, syndromes are calculated by the reproducing signal processing circuit 16. At step n5, it is decided whether or not the number of errors is equal to or greater than the reference value, and when the number of errors is less than the reference value, the recording operation is returned to step n1 and the next data are inputted.

When the number of errors is equal to or greater than the reference value, the recording operation proceeds to step n6 and inputting of data from the external computer 2 is stopped. At step n7 then, the data are read from the memory 6 and at step n8 the data are re-recorded. At step n9 the recorded data are reproduced immediately after recorded and at step n10 syndromes are calculated in the reproducing signal processing circuit 16. At step n11, it is decided whether or not the number of errors in the data is equal to or greater than the reference value, and when the number of errors is less than the reference value, the recording operation is returned to step n1 and the next data from the external computer 2 are inputted. In case that the number of errors is equal to or greater than the reference value, the recording operation is returned to step n7 and the re-recording operation is performed again.

The above-mentioned operation is described below as referring to FIG. 3. Immediately after the data D1 is recorded in the frame F1, the data D1 is reproduced and the recording state is inspected. When the number of errors in the reproduced data D1 is equal to or greater than the reference value, the data D1 is re-recorded. At this time the data D1 is re-recorded in the frame F4, since data D2 and D3 are recorded respectively in frames F2 and F3 while the recording state of the data D1 is being inspected.

According to the embodiment of the present invention as mentioned above, since a recording state can be detected quantitatively, inspection of the recording state immediately after recording can be easily performed. And by selecting as the reference value a number less than the maximum number of errors which can be corrected by means of the first and second error correction codes C1 and C2, it is possible to record data without apprehension that the errors cannot be corrected because the increased number of errors has been caused by a plurality of reproducing operations. In this way, when the R-DAT1 is used as an auxiliary storage of the external computer 2, its reliability as the auxiliary storage can be remarkably improved.

The present invention can be embodied in other various forms without deviating from its spirit or its main features. The above-mentioned embodiments, therefore, are only examples in every point. A scope of the invention is described in its claims and is not restricted at all by the main text of this specification.

Moreover, every transformation or modification belonging to an equivalent scope of the claims of the invention is included in the scope of the invention.

What is claimed is:

1. A data recording/reproducing apparatus, comprising:
   recording means for recording data and error correction data in a first unit recording area of a recording medium;
   reading means for reading the recorded data from said first unit recording area immediately after said data is recorded;
   error detecting means for detecting errors in the read data according to the read error correction data;
   counting means for counting a number of errors according to an output of said error detecting means; and
   comparing means for comparing said number of errors with a reference value to determine when a unit recording area is defective;
   said recording means re-recording said data recorded in said first unit recording area into a second unit recording area of the recording medium when said comparing means has determined that said first unit recording area is defective.

2. The data recording/reproducing apparatus as claimed in claim 1 wherein said error correction data consists of a vertical parity check code of a first error correction code and a horizontal parity check code of a second error correction code.

3. The data recording/reproducing apparatus as claimed in claim 1 wherein said error detecting means calculates a syndrome which indicates a number of errors and a location where each error occurs for each unit data row, using at least one of said first and second error correction codes.

* * * * *